United States Patent Office 3,317,488
Patented May 2, 1967

3,317,488
SULFUR-CONTAINING POLYMERS
Rudolf J. Eckert, Beuel (Rhine), Germany, and Lloyd C. Fetterly, Oakland, Calif., assignors to Shell Oil Company, New York, N.Y., a corporation of Delaware
No Drawing. Filed Nov. 5, 1963, Ser. No. 321,430
4 Claims. (Cl. 260—79)

This invention relates to novel and valuable sulfur-containing polymers. More particularly, the invention relates to sulfur-containing polymers of ethylenically unsaturated compounds.

Specifically, the invention provides new and useful sulfur-containing polymers prepared by the process which comprises reacting an ethylenically unsaturated compound simultaneously with hydrogen sulfide and sulfur dioxide in the mole ratio of $H_2S:SO_2$ of about 2:1. The invention further relates to the process for preparing said polymers.

It is known that sulfur can be made to react with paraffins or olefins at elevated temperatures. However, in such instances the elemental sulfur ($S_8$) is not the reacting agent under such conditions, i.e., the "reacting sulfur" is produced from $S_8$ by heating at such high temperatures. It is also known that rubber has been vulcanized by alternating treatment of the unsaturated polymer with $SO_2$ and $H_2S$. It is further known that certain trialkyl-substituted ethylenes when alternatively treated with $SO_2$ and $H_2S$ give organic tetrasulfides in extremely low yields (2–4%). These two processes are limited to rubber polymers and t-olefins and suffer from many disadvantages such as low yield, liquid phase reaction only, and no control of sulfur incorporated therein. As also noted above, the reaction is alternating and non-continuous with no control of relative amounts of $SO_2$ and $H_2S$ since $SO_2$ is injected first in large excess.

It has now been unexpectedly discovered that sulfur-containing polymers of ethylenically unsaturated compounds may be prepared in either the liquid or vapor phase and wherein the amount of sulfur incorporated into the polymer is controlled by a process which comprises continuously and simultaneously reacting $H_2S$ and $SO_2$ in a mole ratio of about 2:1 with an ethylenically unsaturated compound, preferably an unsaturated hydrocarbon.

It is therefore the primary object of the present invention to provide novel sulfur-containing polymers of unsaturated compounds in high yield. It is another object to provide a continuous process for preparing sulfur-containing polymers. These and other objects will become apparent from the following disclosure and discussion.

These and other objects are accomplished by the process of the present invention which comprises reacting an unsaturated compound simultaneously and continuously with $H_2S$ and $SO_2$ in a mole ratio of from 1:1 to 3:1.

The sulfur-containing polymers of the present invention are useful for a wide range of purposes. They are particularly useful as additives where sulfur is desirable, such as, for example, to vulcanize rubbers and in insecticides. They are also useful as starting materials for reduction to dimercaptans and the like. In particular, the styrene-sulfur copolymer gives a clear, nearly odorless solution in solvents such as benzene and produce strong films with excellent adhesion to iron. Other polymers such as those from butadiene and isoprene remain plastic after standing for several months, yet contain as much as 75% or more sulfur. Normally, heretofore known products containing this amount of sulfur tended to crystallize in just a few weeks. Therefore, the present plastic polymers have numerous uses, especially in the field of low cost coatings and road paints. Further, the hydrogenation of the allyl alcohol-sulfur copolymer yields the 1,2-dimercaptoglycerin analog, which is difficult to prepare by alternate means.

Thus, the process of the present invention offers several advantages over heretofore limited related processes in that the present process is continuous, control of the sulfur incorporated in the polymer is possible, and the process may be performed in either the vapor or liquid phase. The instant process differs in at least one other material respect, i.e., the present process uses a ratio of $H_2S$ to $SO_2$ of approximately 2:1, whereas the prior processes use an excess of $SO_2$ injected into the process prior to the introduction of $H_2S$ with subsequent alternating introduction of $SO_2$.

The sulfur-containing polymers of the present invention are prepared by adding $H_2S$ and $SO_2$ simultaneously in a mole ratio of about 2:1, respectively, to the ethylenically unsaturated compounds or to a solution thereof in an inert solvent under vigorous stirring and, generally, in the presence of a suitable catalyst. $H_2S$ and $SO_2$ are soluble enough in most common solvents to provide always a useful concentration of the two gases in the liquid phase. In general, the mole ratio of $H_2S$ to $SO_2$ will range from about 1:1 to 3:1, although ratios outside this range may be employed. A mole ratio of 1.7:1 to 2.3:1 is preferred with a mole ratio of about 2:1 being especially preferred for most unsaturated monomers.

The unsaturated monomers which are suitable for the preparation of the sulfur copolymers of the present invention include the aliphatic acyclic olefins, particularly those having at least six carbon atoms such as hexene, heptene, octene, nonene, dodecene, cetene and the like, and more particularly the aliphatic conjugated diolefins such as butadiene, isoprene, piperylene, dimethyl butadiene, ethyl butadiene, and the like; cycloalkenes, such as cyclopentene, cyclohexene, cyclopentadiene, cycloheptene, cycloheptadiene, cyclooctene, cyclohexadiene, and the like; aryl olefins such as styrene, ring-substituted styrene such as chlorostyrene, bromostyrene, methylstyrene, m-divinyl benzene and the like, and α-methyl styrene; vinyl compounds such as acrylonitrile, acrylic acid, methacrylonitrile, vinyl acetate, methyl methacrylate, ethyl acrylate, and vinyl chloride; allyl compounds such as allyl alcohol, allyl chloride, allyl acetate, cinnamyl bromide, cinnamyl acetate and cinnamyl alcohol; and unsaturated alkyne-aryl compounds such as phenyl acetylene and diphenyl-acetylene. Thus, suitable unsaturated monomers include those compounds containing a $CH_2=C<$ terminal group, i.e., a vinylidene group.

Suitable solvents for the monomers which may be employed as desired include, among others, aliphatic hydrocarbons such as pentane, hexane, heptane, octane, nonane, and the like; aromatic hydrocarbons such as benzene, toluene, xylene and the like, ethers such as diisopropyl ether, divinyl ether, diallyl ether and tetrahydrofuran; ketones such as acetone, methyl ethyl ketone, methyl butyl ketone and the like; and $H_2S$-$SO_2$ solutions. Preferred solvents are benzene, pentane and tetrahydrofuran.

Although catalysts are not required to prepare the polymers of the present invention, a catalyst is generally employed. Liquid or vaporous water, even in trace quantities, is a very suitable catalyst. Other catalysts include, among others, pyridine, dimethylformamide, carbon disulfide, and other polar compounds such as alcohols, glycols and the like.

The polymerization process may be performed at subatmospheric, atmospheric or superatmospheric pressure, depending generally upon the monomers employed and whether a liquid or vapor phase polymerization is desired. Atmospheric or slightly superatmospheric pressures are preferred.

The process may be performed throughout a relatively wide temperature range, and generally a temperature range wherein the $H_2S$ and $SO_2$ react and combine to form sulfur is employed. Such a temperature range is normally from about $-90°$ C. to about $50°$ C. with the preferred range being from about $-10°$ C. to about $15°$ C. It was found that this preferred range could be effectively achieved by cooling the reaction with ice water.

The process for preparing the new and valuable sulfur-containing polymers and their properties are illustrated by the following examples. The reactants, their proportions and other specific ingredients of the recipes are presented as being typical and various modifications can be made in view of the foregoing disclosure, without departing from the spirit or scope of the disclosure or of the claims.

sample was dried over $P_2O_5$ and paraffin in vacuo at room temperature. The polymer had a softening point of $90–100°$ C. and decomposed at $170°$ C. The analysis of the polymer was: C, 27%; H, 4.4%; S, 57.5%.

*Example II*

The procedure of Example I was essentially repeated wherein a number of other unsaturated monomers were substituted for the allyl alcohol. The data and results are generally tabulated in Table I. In all instances water was used as the catalyst, the reaction time was 60 minutes and the mole ratio of $H_2S:SO_2$ was approximately 2:1, i.e., between about 1.7:1 and 2.3:1.

TABLE I

| Unsaturated Monomer | Monomer Amount, ml. | Solvent | Reaction Phase | Yields, g. | | Polymer, mol. wt. | Polymer Analysis | | | Remarks |
|---|---|---|---|---|---|---|---|---|---|---|
| | | | | S | Polymer | | C | H | S | |
| Cyclohexene | 250 | None | Liquid | | 30 | | 11 | 2.0 | 87.1 | Product soluble in benzene, odorless and colorless; very little free sulfur; resin soft point, 80–100° C.; resin decomposes at 250° C. |
| Styrene | 100 | 200 ml. THF. | do | 0 | 110 | ² 3,800 | 45.1 | 3.8 | 49.9 | |
| α-Methyl styrene | 100 | 200 ml. THF. | do | 40 | 60 | ² 3,000 | 48.4 | 4.5 | 45.7 | Resin softens at 80–100° C. and decomposes at 250° C. |
| Divinyl benzene | 150 | 150 ml. THF. | do | Very little. | | | 51.9 | 4.8 | 41.0 | Resin gelled, insoluble in solvents, decomposes at 170° C. |
| Ethyl acrylate | 150 | 150 ml. THF. | do | Little | 46 | ³ 3,000 | 35.1 | 4.2 | 46.3 | Benzene-soluble, odorless, transparent yellow resin. |
| Butadiene | ¹ 3:2:1 | None | Vapor | Some | | | 13.5 | 2.4 | 72.5 | Resin softening point: 65–70° C.; decomposes, 105–125° C.; insoluble in most inert solvents. |
| Do | ¹ 3:2:1 | 250 ml. THF. | Vapor-liquid. | None | 60 | | 20.2 | 4.1 | 62.0 | Viscous brown, oil; sets to rubber upon standing. |
| Do | ¹ 1:4:2 | 250 ml. benzene. | do | Some | | | 7.1 | 1.1 | 87.5 | Yellow resin turns brown on standing. |
| Isoprene | 100 | 200 ml. THF. | Liquid | None | 40 | | 32.1 | 4.3 | 60.7 | Orange viscous oil which will cure rubber cements; sets to rubber solid in five days. |
| Cinnamyl alcohol | 100 | 150 ml. THF. | do | 45 | 135 | ⁴ 350 | 64.3 | 6.0 | 20.2 | Yellow, viscous oil product. |

¹ Molar ratio of butadiene: $H_2S=SO_2$.
² VP osmometer, dichloromethane.
³ Ebulliscopically in benzene.
⁴ VP osmometer, methyl ethyl ketone.

In general, the following procedure unless otherwise noted was employed throughout the examples: A 500 ml., three-necked flask fitted with a high-speed stirring means, two gas inlet tubes and one gas outlet tube was utilized as the reactor. The rate of gas addition was determined by two flow meters. During the reaction the reaction flask was cooled with an ice-water mixture. The usual method was employed to isolate the reaction products, i.e., the reaction products were filtered and the filtrate evaporated to obtain the soluble reaction polymers.

*Example I*

Into the above-described reactor were placed 300 ml. of allyl alcohol. Then under ice-water cooling and vigorous stirring, 2 molar parts of $H_2S$ and 1 molar part of $SO_2$ were introduced simultaneously for one hour. The yellow precipitate (sulful) was separated by filtration and dried (25 gr.). The filtrate was evaporated in vacuo at room temperature and yielded 27 grams of a yellow resin. The resin became rubbery after a few days.

If the introduction of the hydrogen sulfide and sulfur dioxide is continued for a longer time, the allyl alcohol-sulfur polymer will also separate together with the free sulfur. In such a case the mixture was dissolved in tetrahydrofuran (THF) using a Soxhlet unit. Then from thes solvent, the free sulfur was separated by fractional crystallization.

A small amount was purified by chromatography on aluminum oxide. (WOEIM, neutral, activity I) using THF as solvent. After evaporation of the solvent, the

*Example III*

This example illustrates the effectiveness of an isoprene-sulfur copolymer as a vulcanizing agent.

Twenty ml. of a 15.3 solution of a block polymer styrene-butadiene (10–100–10M) in cyclohexene were mixed with 0.9 gram of the isoprene-sulfur copolymer prepared as in Example II. Vulcanization occurred within one-half hour at room temperature. The isoprene-sulfur polymer was one day old when used for this test and had been stored at room temperature.

In another experiment, 1.1 gram of the isoprene-sulfur polymer was stirred into 20 ml. of Carter's Clear Grip Rubber cement. Vulcanization occurred within two hours at room temperature.

*Example IV*

The procedure of Example I was substantially repeated wherein the unsaturated monomer was n-hexadecene-1. A nearly colorless waxy product was formed, which could be recrystallized from ethanol and melted at $78–80°$ C. A molecular weight of 482 was determined by mass spectroscopy.

*Example V*

The procedure of Example I is substantially repeated wherein the unsaturated compound is phenyl acetylene. A yellow polymer is obtained.

*Example VI*

This example demonstrates the approximate structure of the styrene-sulfur copolymer.

The polymer products prepared from styrene and $H_2S/SO_2$ are oil-soluble and have a pleasant odor. The copolymer is deemed to be an alternating linear polymer having two or more sulfur groups per monomer unit (50% by weight sulfur or higher) with the following approximate structure:

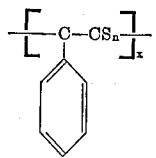

wherein $n=2, 3, 4$, etc., with 3 being usual, and $x$ is about 15–25.

A solution of 15 grams of a styrene-sulfur copolymer having an assumed structure of

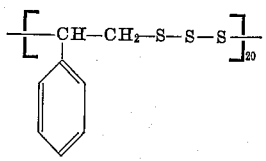

and a molecular weight of 3800±200 (viscosimetric determination in dichloromethane) in 100 ml. of dry THF was added dropwise to a suspension of 6 grams lithium aluminum hydride in 250 ml. of dry THF under a nitrogen atmosphere. After the addition was complete, the reaction mixture was heated to 70° C. for five minutes. The solution was then cooled with ice and enough isopropanol was added to destroy the excess reducing agent. The reaction products were then hydrolyzed with 150 ml. of 5 N HCl, causing the formation of two layers. The acidic mixture was extracted three times with ether. The ether extracts were dried over magnesium sulfate and evaporated under reduced pressure at room temperature. The resulting pale yellow liquid (10 g.) had the characteristic mercaptan odor and likely following structure:

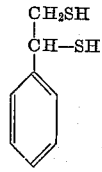

2.1 grams of the crude mercaptan were added dropwise to a solution of 5 grams $AgNO_3$ in 50 ml. of water.

A yellow precipitate (75% yield) was formed immediately and was filtered after one hour, washed with copious amounts of water, dried over $P_2O_5$ in vacuo at room temperature, and analyzed.

Calculated (for $C_8H_9S_2Ag$—277.2): C, 34.7; H, 3.2; S, 23.1; Ag, 38.9. Found: C, 36.3 H, 3.2; S, 19.1; Ag, 35.6.

The NMR spectrum of the liquid is in complete accordance with the expected mercaptan structure: 5 aromatic hydrogen, 2 mercapto hydrogen and 3 aliphatic hydrogen atoms were found.

We claim as our invention:

1. A process for preparing plastic sulfur-containing polymers which comprises reacting at a temperature of from —10° C. to 15° C. an ethylenically unsaturated compound selected from the group consisting of (a) aliphatic acyclic olefins containing at least 6 carbon atoms, (b) aliphatic conjugated diolefins containing from 4 to 6 carbon atoms, (c) cycloalkenes, (d) aryl olefins and (e) ethyl acrylate with a mixture of hydrogen sulfide and sulfur dioxide in the mole ratio of $H_2S:SO_2$ of from 1:1 to 3:1.

2. A process as in claim 1 wherein the aliphatic conjugated diene is butadiene.

3. A process as in claim 1 wherein the aryl olefin is styrene.

4. A process as in claim 1 wherein the conjugated diene is isoprene.

References Cited by the Examiner
UNITED STATES PATENTS

| 2,599,544 | 6/1952 | Crouch et al. | 260—79.3 |
| 2,989,513 | 6/1961 | Hendry et al. | 260—79 |
| 3,231,546 | 1/1966 | Bertozzi et al. | 260—79 |

OTHER REFERENCES

52 Chemical Abstracts, page 2482h (1958).
57 Chemical Abstracts, page 8166b (1962).

DONALD E. CZAJA, *Primary Examiner.*

LEON J. BERCOVITZ, M. I. MARQUIS,

*Assistant Examiners.*